(12) United States Patent
Smith et al.

(10) Patent No.: US 9,938,680 B2
(45) Date of Patent: Apr. 10, 2018

(54) FITTINGS FOR IRRIGATION SYSTEMS

(71) Applicants: Duane K. Smith, St. Charles, MO (US); Thomas A. King, Ballwin, MO (US); Scott L. Blankley, Wildwood, MO (US)

(72) Inventors: Duane K. Smith, St. Charles, MO (US); Thomas A. King, Ballwin, MO (US); Scott L. Blankley, Wildwood, MO (US)

( * ) Notice: Subject to any disclaimer, the term of this patent is extended or adjusted under 35 U.S.C. 154(b) by 0 days.

(21) Appl. No.: 14/947,822

(22) Filed: Nov. 20, 2015

(65) Prior Publication Data

US 2016/0146388 A1    May 26, 2016

Related U.S. Application Data

(60) Provisional application No. 62/083,051, filed on Nov. 21, 2014.

(51) Int. Cl.
*F16L 41/00* (2006.01)
*E02B 11/00* (2006.01)
*A01G 25/02* (2006.01)
*F16L 41/12* (2006.01)

(52) U.S. Cl.
CPC .......... *E02B 11/005* (2013.01); *A01G 25/023* (2013.01); *F16L 41/12* (2013.01)

(58) Field of Classification Search
CPC ........ F16L 41/01; F16L 41/12; A01G 25/023; E02B 11/05
USPC .................. 285/197–199; 137/318; 239/272
See application file for complete search history.

(56) References Cited

U.S. PATENT DOCUMENTS

| 2,373,555 A |  | 4/1945 | Folke |
| 3,448,758 A |  | 6/1969 | Mullins |
| 3,554,217 A |  | 1/1971 | Ehrens |
| 3,732,886 A |  | 5/1973 | Mullins |
| 3,806,031 A | * | 4/1974 | Olson .................. A01G 25/023 285/197 X |
| 3,901,268 A |  | 8/1975 | Mullins |
| 3,920,037 A |  | 11/1975 | Hoff |
| 4,112,944 A |  | 9/1978 | Williams |
| D272,850 S |  | 2/1984 | Kulie |
| 4,522,339 A |  | 6/1985 | Costa |
| 4,574,477 A |  | 3/1986 | Lemkin et al. |
| 4,787,557 A |  | 11/1988 | Jackson |

(Continued)

FOREIGN PATENT DOCUMENTS

| WO | WO 94/00003 | 1/1994 |
| WO | WO 2016/081877 A1 | 5/2016 |
| WO | WO 2015/089410 A2 | 6/2016 |

OTHER PUBLICATIONS

U.S. Appl. No. 29/509,921, filed Nov. 21, 2014, Smith et al.

(Continued)

*Primary Examiner* — Gregory J Binda

(57) ABSTRACT

A fitting, for use in making a fluid connection with a pipe, generally includes a saddle adapted to couple the fitting to the pipe, and a tap integrally formed with the saddle and extending generally away from saddle. The tap is configured to press-fit into the pipe for establishing the fluid connection between the fitting and the pipe. The fitting also includes a passageway defined by the saddle and the tap, for receiving fluid from the pipe and into the fitting via the tap.

20 Claims, 18 Drawing Sheets

(56) References Cited

U.S. PATENT DOCUMENTS

| | | | |
|---|---|---|---|
| 5,054,820 A | 10/1991 | Lesquir | |
| 5,353,831 A | 10/1994 | Roth | |
| 5,694,972 A * | 12/1997 | King | A01G 25/023 137/318 |
| 6,216,723 B1 | 4/2001 | King | |
| 6,454,312 B1 | 9/2002 | Desorcy et al. | |
| 6,484,440 B2 | 11/2002 | Brown | |
| 6,681,796 B2 | 1/2004 | King, Jr. | |
| 6,773,036 B1 * | 8/2004 | King | F16L 47/345 24/20 TT |
| 6,986,532 B1 | 1/2006 | King | |
| 7,150,289 B2 | 12/2006 | Mortensen | |
| 7,150,476 B2 | 12/2006 | King | |
| D536,925 S | 2/2007 | MacLer | |
| 7,219,684 B2 | 5/2007 | Dabir et al. | |
| D624,810 S | 10/2010 | Vosbikian | |
| D638,914 S | 5/2011 | Schmuckle | |
| 7,946,010 B1 | 5/2011 | Myers et al. | |
| D653,335 S | 1/2012 | Kampa et al. | |
| D653,337 S | 1/2012 | Kampa et al. | |
| D654,988 S | 2/2012 | Bloink | |
| 8,172,276 B1 | 5/2012 | King et al. | |
| D665,481 S | 8/2012 | Bloink | |
| D737,952 S | 9/2015 | Matsumura | |
| D745,699 S | 12/2015 | Clarke | |
| D759,816 S | 6/2016 | Ingram | |
| D778,410 S | 2/2017 | Smith et al. | |
| 9,599,268 B2 | 3/2017 | King et al. | |
| D783,132 S | 4/2017 | Smith | |
| D797,904 S | 9/2017 | Smith et al. | |
| 2006/0027266 A1 | 2/2006 | Kim et al. | |
| 2006/0065306 A1 | 3/2006 | Mortensen | |
| 2009/0145488 A1 | 6/2009 | Hoskisson et al. | |
| 2012/0223156 A1 | 9/2012 | Nourian | |
| 2015/0167884 A1 | 6/2015 | King et al. | |
| 2015/0181820 A1 | 7/2015 | Crook | |
| 2015/0300543 A1 | 10/2015 | Boaz et al. | |
| 2016/0146388 A1 | 5/2016 | Smith | |
| 2017/0191596 A1 | 7/2017 | King | |
| 2017/0205013 A1 | 7/2017 | Smith et al. | |

OTHER PUBLICATIONS

U.S. Appl. No. 14/568,952, filed Dec. 12, 2014, King et al.
U.S. Appl. No. 29/546,354, filed Nov. 20, 2015, Smith et al.
Perforador Panther, http://prakoragro.com/products/perforador/perforador-panther-tena-7/, 4 pages, printed Aug. 24, 2016.
U.S. Appl. No. 29/592,931, filed Feb. 3, 2017, Smith et al.
U.S. Appl. No. 15/463,271, filed Mar. 20, 2017, King et al.
U.S. Appl. No. 29/599,427, filed Apr. 3, 2017, Smith et al.
U.S. Appl. No. 15/480,261, filed Apr. 5, 2017, Smith et al.

* cited by examiner

FITTINGS FOR IRRIGATION SYSTEMS

CROSS-REFERENCE TO RELATED APPLICATION

This application claims the benefit of and priority to U.S. Provisional Application No. 62/083,051, filed on Nov. 21, 2014. The entire disclosure of the above application is incorporated herein by reference.

FIELD

The present disclosure generally relates to fittings and, more particularly, to fittings for irrigation systems where the fittings can be pressed onto pipes of the irrigation systems.

BACKGROUND

This section provides background information related to the present disclosure which is not necessarily prior art.

Underground irrigation systems are often used to direct water to vegetation to help facilitate growth of the vegetation. Typically, the underground irrigation systems include main water lines and lateral lines extending therefrom. The lateral lines are connected to the main lines through various pipe fittings, and interconnect the main lines with one or more irrigation sprinkler heads for distributing the water to the vegetation.

SUMMARY

This section provides a general summary of the disclosure, and is not a comprehensive disclosure of its full scope or all of its features.

Exemplary embodiments of the present disclosure generally relate to fittings for use in making fluid connections with pipes. Exemplary embodiments of the fittings can be press-fit onto pipes, to create fluid connections with the pipes, for example, without threading the fittings or portions thereof to install the fittings to the pipes.

In one exemplary embodiment, such a fitting generally includes a saddle adapted to couple the fitting to the pipe, and a tap integrally formed with the saddle and extending generally away from saddle. The tap is configured to insert at least partly into the pipe for establishing the fluid connection with the pipe. The fitting also includes a passageway defined by the saddle and the tap, for receiving fluid from the pipe and into the fitting via the tap.

In another exemplary embodiment, such a fitting generally includes a saddle for coupling the fitting to the pipe, and a tap coupled to the saddle and configured to press-fit into the pipe, without threading the tap relative to the saddle, for establishing the fluid connection between the fitting and the pipe.

In still another exemplary embodiment, such a fitting generally includes a body, a clamp coupled to the body where the clamp is configured to couple the fitting to the pipe, and a tap coupled to the body and extending generally away from the body. The tap is configured to press-fit into the pipe for establishing the fluid connection between the fitting and the pipe. The fitting further includes a passageway defined by the body and the tap, for receiving fluid from the pipe and into the fitting via the tap Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference names indicate corresponding parts throughout the several views of the drawings.

DETAILED DESCRIPTION

The description and specific examples provided herein are intended for purposes of illustration only and are not intended to limit the scope of the present disclosure.

Exemplary embodiments of the present disclosure generally relate to fittings, for example, for use in irrigation systems used to direct water to vegetation. The fittings of the present disclosure can be used in the irrigation systems to interconnect main lines (or other lines) of the systems with other components of the systems, for example, sprinkler heads for distributing the water to the vegetation (e.g., from main lines of the irrigation systems, etc.), etc. In various embodiments, the fittings are single structures or pieces that, uniquely, can be press-fit (e.g., manually by users, etc.) onto the lines of the irrigation systems to establish fluid connection, without threading or rotating the fittings (or any portions thereof) in order to install them to the lines.

With reference now to the drawings, FIGS. 1-10 illustrate an exemplary embodiment of a fitting 100 including one or more aspects of the present disclosure.

Figure 1:
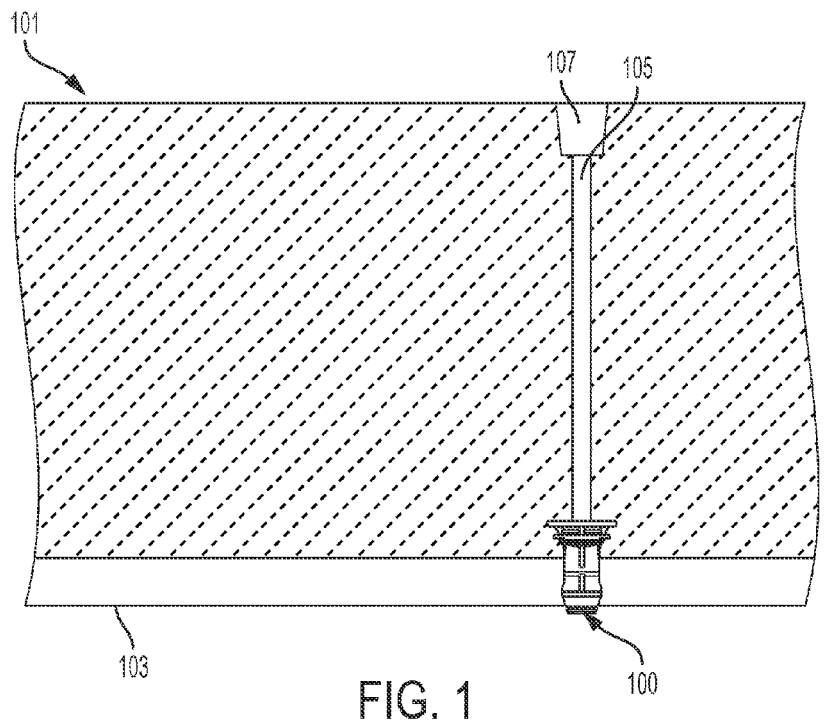
FIG. 1 is a side view of an exemplary embodiment of a fitting of the present disclosure, shown installed in an irrigation system.
Figure 2:
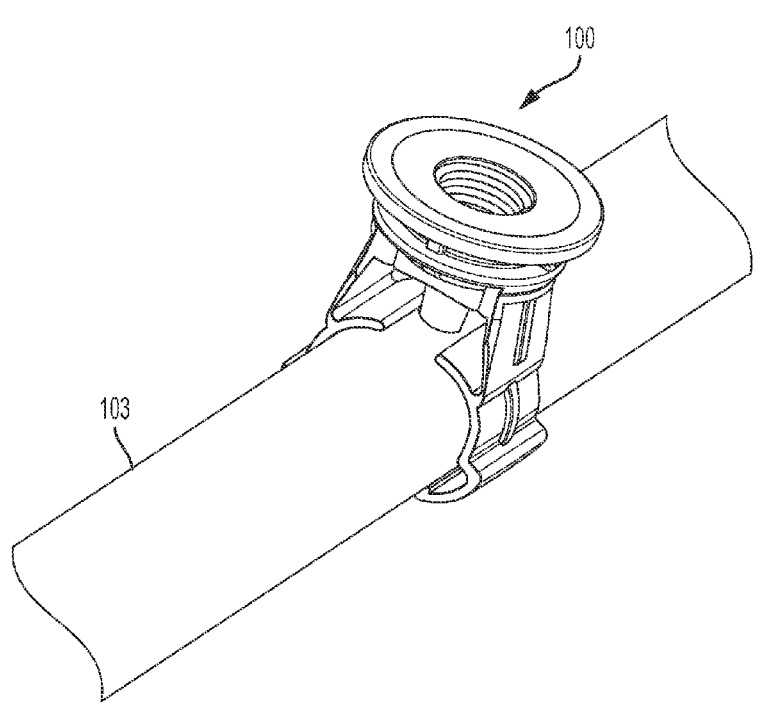
FIG. 2 is an enlarged perspective view of the fitting of FIG. 1, shown installed to a main line in the irrigation system.

As shown in FIGS. 1 and 2, the illustrated fitting 100 is configured for use in an underground irrigation system 101. The illustrated irrigation system 101 generally includes, without limitation, a main water line 103 or pipe (e.g., constructed from polyvinyl chloride (PVC), polyethylene, etc.), a lateral line 105 or pipe (e.g., constructed from polyethylene, etc.) coupled to the main line 103 by the fitting 100, and a sprinkler head 107 coupled to the lateral line 105. As described, the fitting 100 is configured to be press-fit (e.g., manually by a user, etc.) onto the main line 103 of the irrigation system 101 to provide a fluid connection between the main line 103 and the lateral line 105. As such, in operation of the irrigation system 101, water can flow from the main line 103, through the fitting 100, and through the lateral line 105 to the sprinkler head 107 for directing the water to vegetation as desired.

Figure 3:
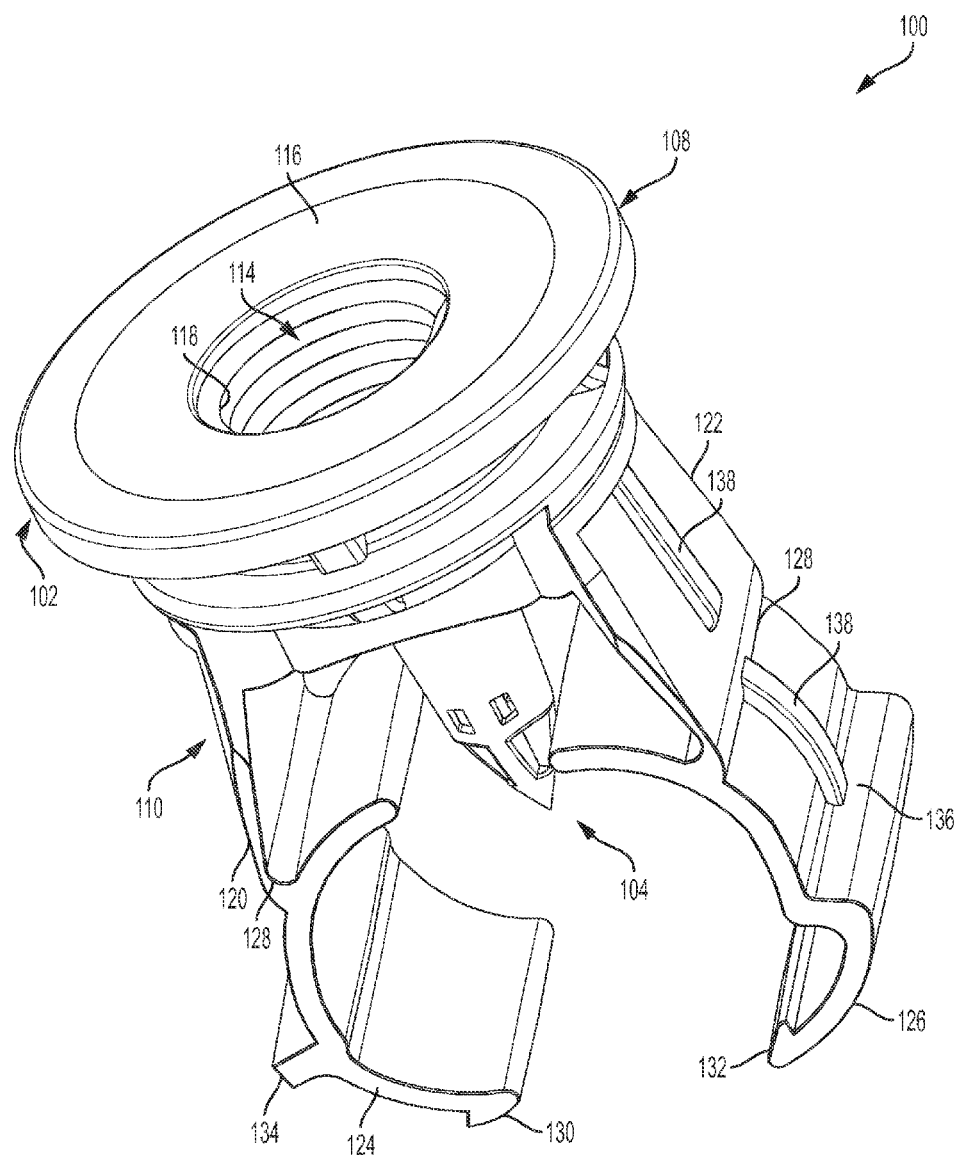
FIG. 3 is a perspective view of the fitting of FIG. 1.
Figure 4:
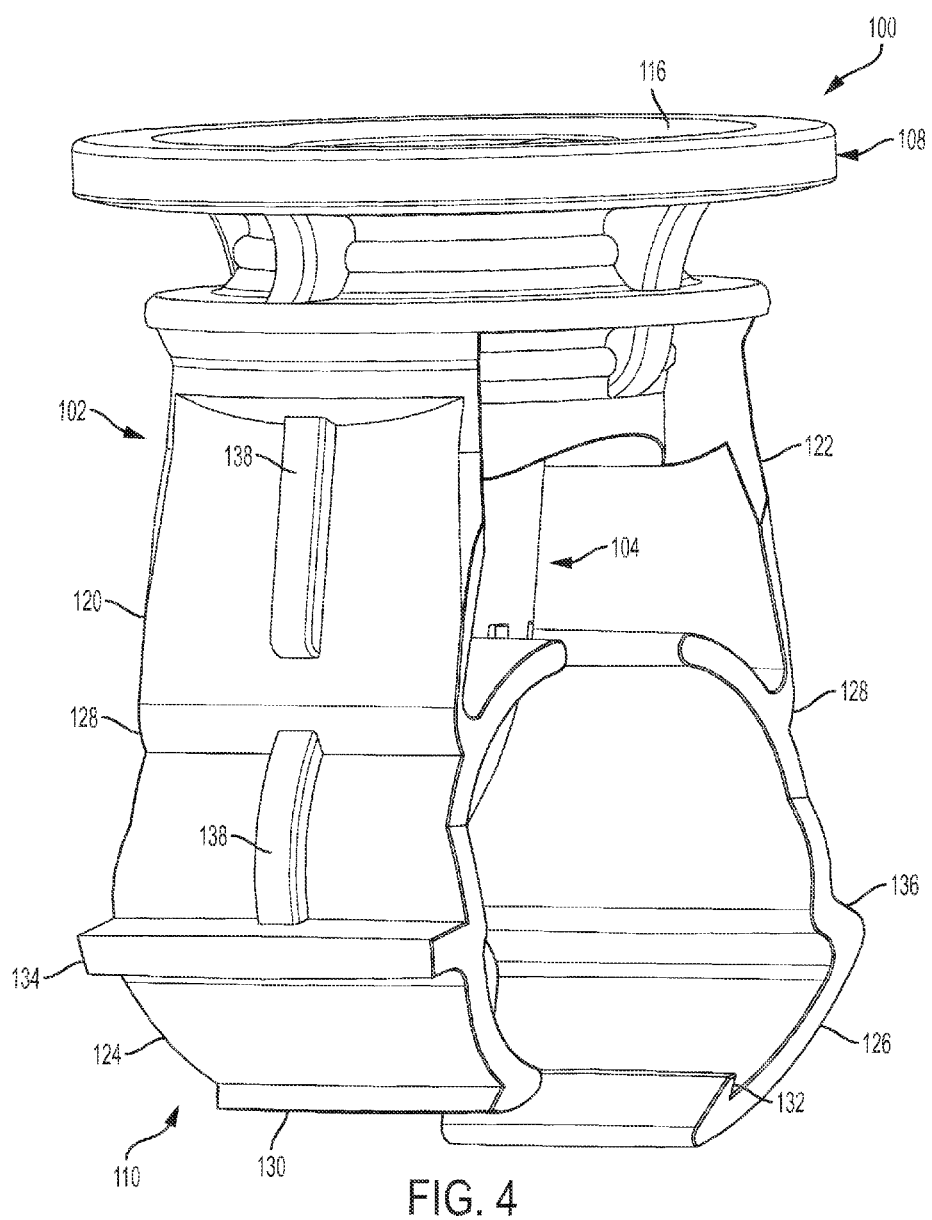
FIG. 4 is another perspective view of the fitting of FIG. 1.

With reference now to FIGS. 3 and 4, the illustrated fitting 100 generally includes a saddle 102 and a tap 104 extending generally downwardly from the saddle 102. The saddle 102 and the tap 104 of the illustrated fitting 100 are formed as a single structure. The fitting 100 can thus be press-fit (e.g., manually by users, etc.) onto the main line 103 of the irrigation system to establish the fluid connection, without threading or rotating the fitting 100 and without threading or rotating the tap 104 relative to the saddle 102 (as in conventional fittings) in order to install the fitting 100 to the main line 103. While the fitting 100 is generally described herein with reference to the main line 103, it should be appreciated that the fitting 100 may be used with other pipes (i.e., pipes other than main lines) within the scope of the present disclosure.

As shown in the irrigation system 101, in use, the saddle 102 is configured to fit over the main line 103 and couple the fitting 100 thereto. And, at the same time, the tap 104 is configured to pierce the main line 103 and make the fluid connection between the main line 103 and one or more other devices coupled to the fitting 100, such as the lateral line 105 and the sprinkler head 107 in the system 101. In addition, when pushing the fitting 100 onto the main line 103 (and, in particular, when pushing the tap 104 into the main line 103 to pierce the main line 103), the saddle 102 helps hold the main line 103 and inhibit the main line 103 from flattening (or crushing) under the pushing force applied to the fitting 100 and the tap 104 (and thus helps facilitate piercing the tap 104 into the main line 103). As such, when the fitting 100 is installed to the main line 103, fluid in the main line 103 can flow through the tap 104 and the saddle 102 to the one or more other devices coupled to the fitting 100.

As previously indicated, in the illustrated embodiment the saddle 102 and the tap 104 of the fitting 100 are integrally, monolithically, etc. formed (e.g., molded, etc.) as one piece, one structure, etc. to define the fitting 100. Alternatively, the saddle 102 and the tap 104 could be formed separately and then subsequently coupled together as desired (e.g., welded together, mechanically coupled together, epoxied together, etc.) to form the fitting 100 (still, generally, as a one-piece structure). In addition, the fitting 100 can be constructed from any suitable material within the scope of the present disclosure including, for example, plastics, metals, combinations thereof, etc.

Also in the illustrated embodiment, the fitting 100 is configured generally as a saddle tee fitting for use in irrigation systems (e.g., the irrigation system 100, etc.). However, it should be appreciated that aspects of the present disclosure may also apply to other fittings (e.g., fittings other than saddle tee fittings, etc.) within the scope of the present disclosure. In addition, it should be appreciated that aspects of the present disclosure may also be implemented in applications other than those involving irrigation systems (e.g., other systems requiring fittings coupled to pipes to make fluid connections between the pipes such as, for example, plumbing systems, etc.) within the scope of the present disclosure. Also in the illustrated embodiment, the fitting 100 and the tap 104 are generally straight in shape. In other example embodiments, fittings may include taps with other shapes (or the fittings themselves may have other shapes) such as, for example, elbow shapes, S-shapes, T-shapes, Y-shapes, etc. and/or taps having other sizes than illustrated herein.

Figure 5:
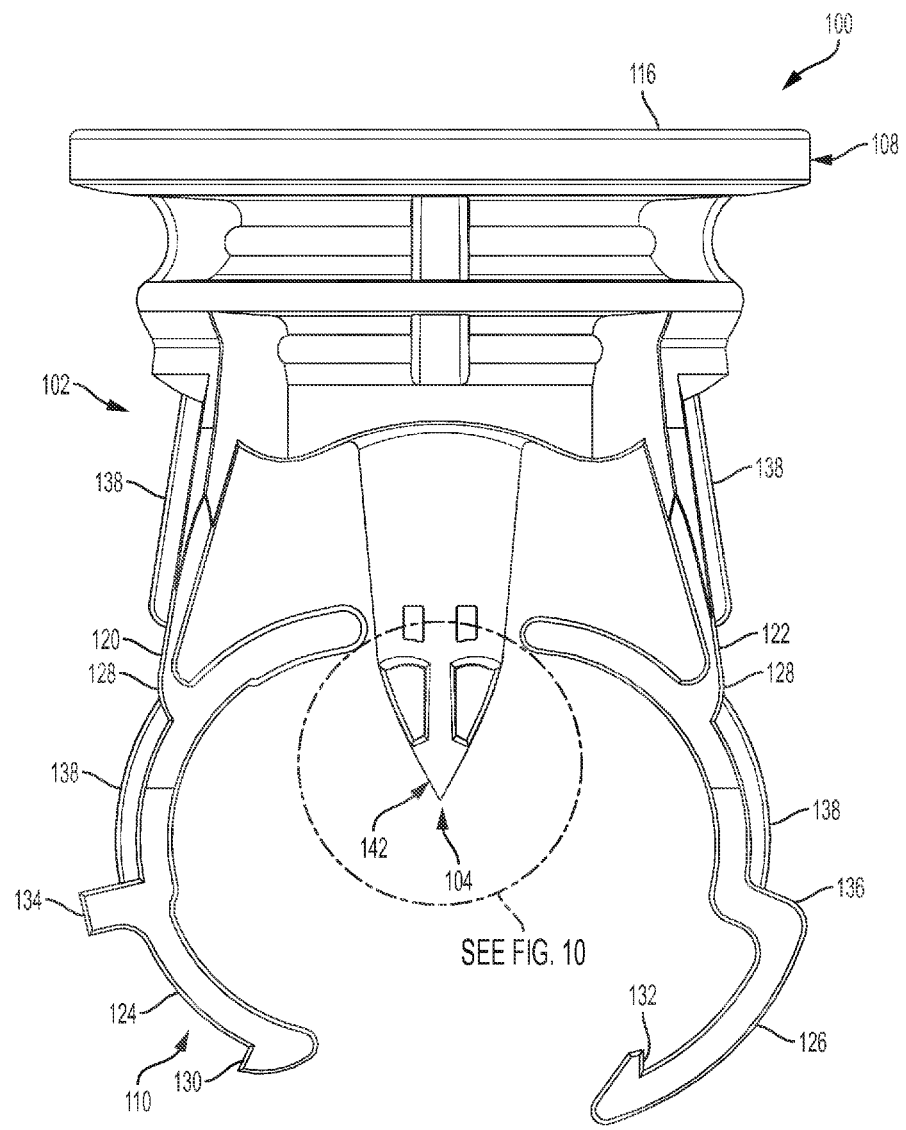
FIG. 5 is a front view of the fitting of FIG. 1.
Figure 6:
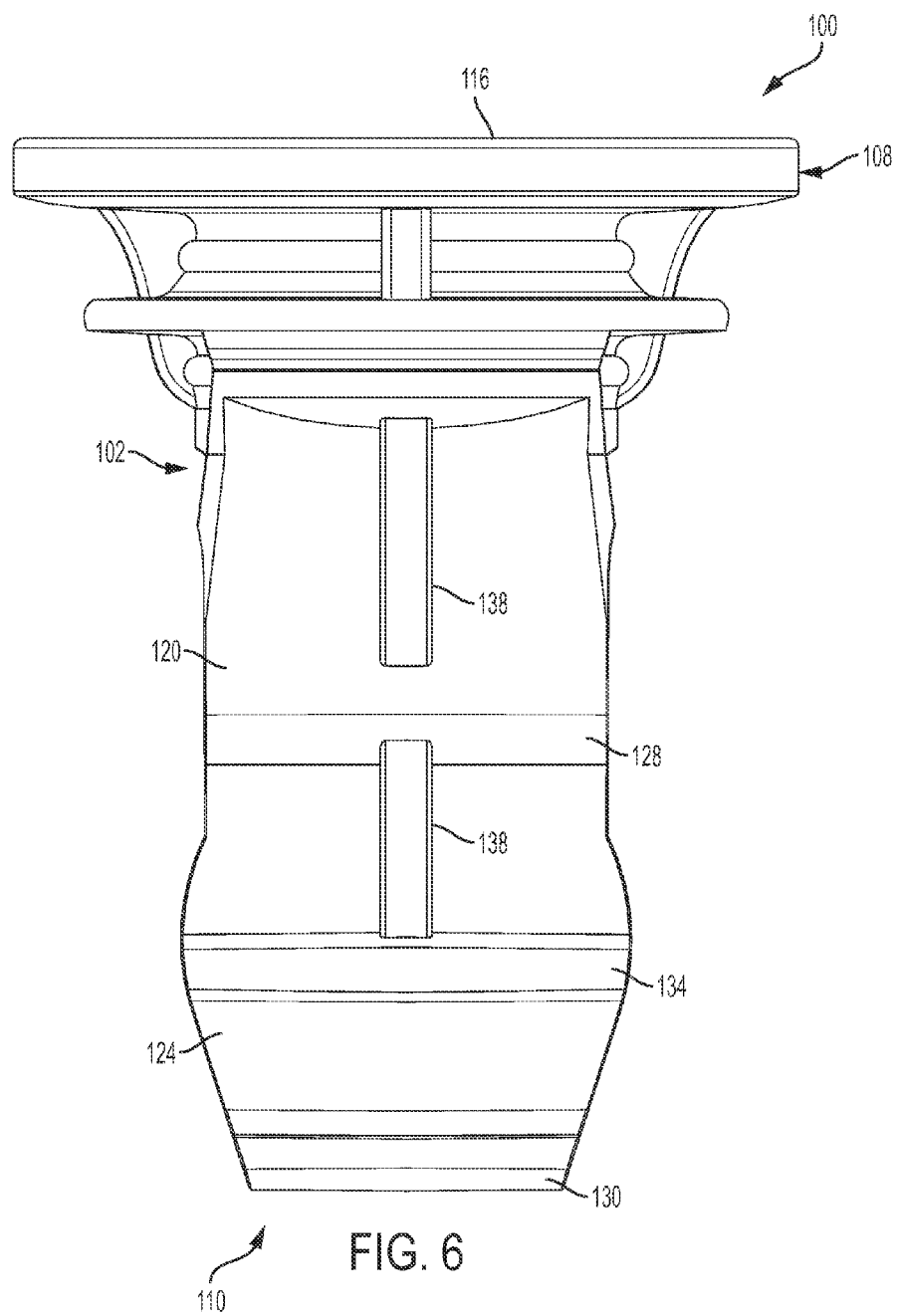
FIG. 6 is a left side view of the fitting of FIG. 1.
Figure 7:
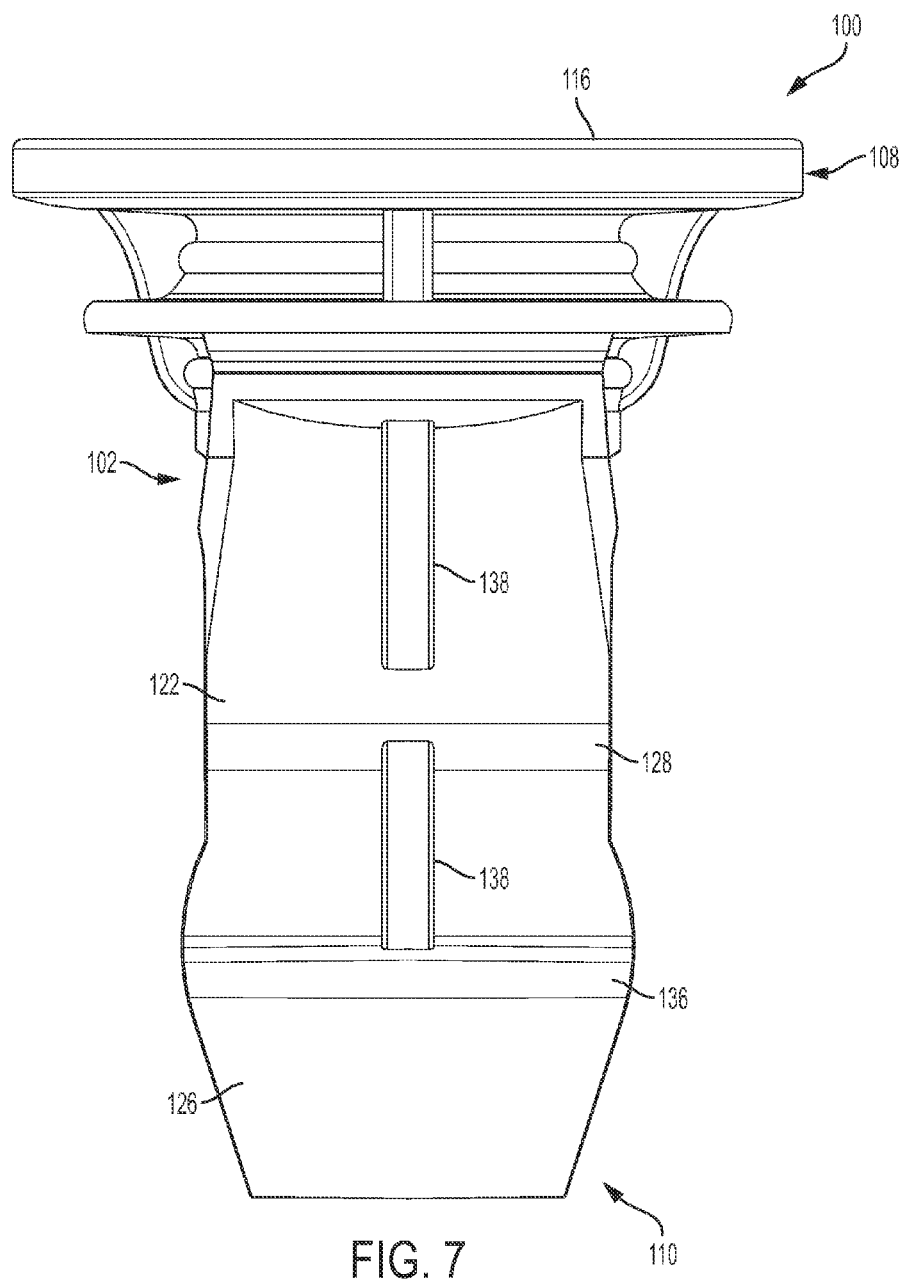
FIG. 7 is a right side view of the fitting of FIG. 1.

With additional reference to FIGS. 5-7, the saddle 102 of the fitting 100 includes a body 108 and a clamp 110. The clamp 110 is disposed generally below the body 108, and operates to hold the fitting 100 on the main line 103. In the illustrated fitting 100, the body 108 and the clamp 110 are integrally formed as one structure to define the saddle 102. Alternatively, the body 108 and the clamp 110 could be formed separately and then subsequently coupled together (e.g., welded together, mechanically coupled together, epoxied together, etc.) to form the saddle 102.

The body 108 of the saddle 102 is generally short and tubular in shape (although other sizes and/or shapes may be used within the scope of the present disclosure). A channel 114 (FIG. 3) extends generally longitudinally through the body 108 and into the tap 104 to provide fluid communication through the fitting 100. An upper end portion of the channel 114, located toward an upper surface 116 of the body 108, is configured (e.g., includes threads 118 as is conventional, etc.) to couple one or more other devices to the fitting 100 (e.g., the sprinkler head 107, etc.), for example, via flexible tubing (such as lateral line 105), funny pipe, etc., to establish the fluid communication between the fitting 100 and the one or more other devices. In addition, the upper surface 116 of the body 108 is also broad and substantially flat, to help facilitate manually pushing the fitting 100 (via the upper surface 116) into connection with the main line 103. As can be appreciated, this broad and substantially flat shape may provide a conducive surface to allow a user to provide sufficient force to push the fitting 100 onto the main line 103 (and to push the tap 104 into the main line 103), and help inhibit fatigue and/or discomfort to the user when doing so. Alternatively, the shape of the upper surface 116 of the body 108 may be substantially concave or convex (e.g., with no rough edges and/or corners, etc.).

The clamp 110 of the saddle 102 includes first and second arms 120, 122 extending generally away from the body 108, and jaw portions 124, 126 coupled to the arms 120, 122. The jaw portions 124, 126 are each generally arcuate in shape, and are each coupled to corresponding arms 120, 122 by hinges 128 (e.g., living hinges, mechanical hinges, etc.). This allows the jaw portions 124, 126 to move, flex, etc. relative to the arms 120, 122 when positioning the main line 103 between the jaw portions 124, 126 (e.g., in preparation for coupling the saddle 102 to the main line 103, etc.). Lips 130, 132 are provided on lower end portions of the jaw portions 124, 126, respectively, for use in holding, securing, etc. the jaw portions 124, 126 together when coupling the saddle 102 to the main line 103. For example, the lower end portions of the jaw portions 124, 126 can be pushed together (flexing at the hinges) until the lips 130, 132 engage and secure the jaw portions 124, 126 together.

In the illustrated embodiment, the jaw portion 124 coupled to the first arm 120 also includes an outer tab 134, and the jaw portion 126 coupled to the second arm 122 also includes a shoulder 136. The tab 134 and the shoulder 136 provide regions for grasping the jaw portions 124, 126 (e.g., by hand, with a tool (e.g., pliers, etc.), etc.) to move the jaw portions 124, 126 together to engage the lips 130, 132. In addition, ribs 138 are formed on the arms 120, 122 to help reinforce the arms 120, 122 against stresses resulting from flexing, moving, etc. the jaw portions 124, 126 relative to the arms 120, 122 (e.g., when coupling the saddle 102 to the main line 103, etc.).

Also in the illustrated embodiment, the jaw portions 124, 126 are coupled to the arms 120, 122 at locations generally between end portions of the jaw portions 124, 126 (e.g., at locations about one third of a distance from upper end portions of the jaw portions 124, 126, at locations about 0.4 inches from upper end portions of the jaw portions 124, 126, etc.). Alternatively, the jaw portions 124, 126 could be coupled to the arms 120, 122 at upper end portions of the jaw portions 124, 126 within the scope of the present disclosure. Also in the illustrated embodiment, a spacing between the first and second arms 120, 122 is generally equal to or greater than an outside diameter of the main line 103, although such a spacing is not required in all embodiments of the present disclosure.

Figure 8:
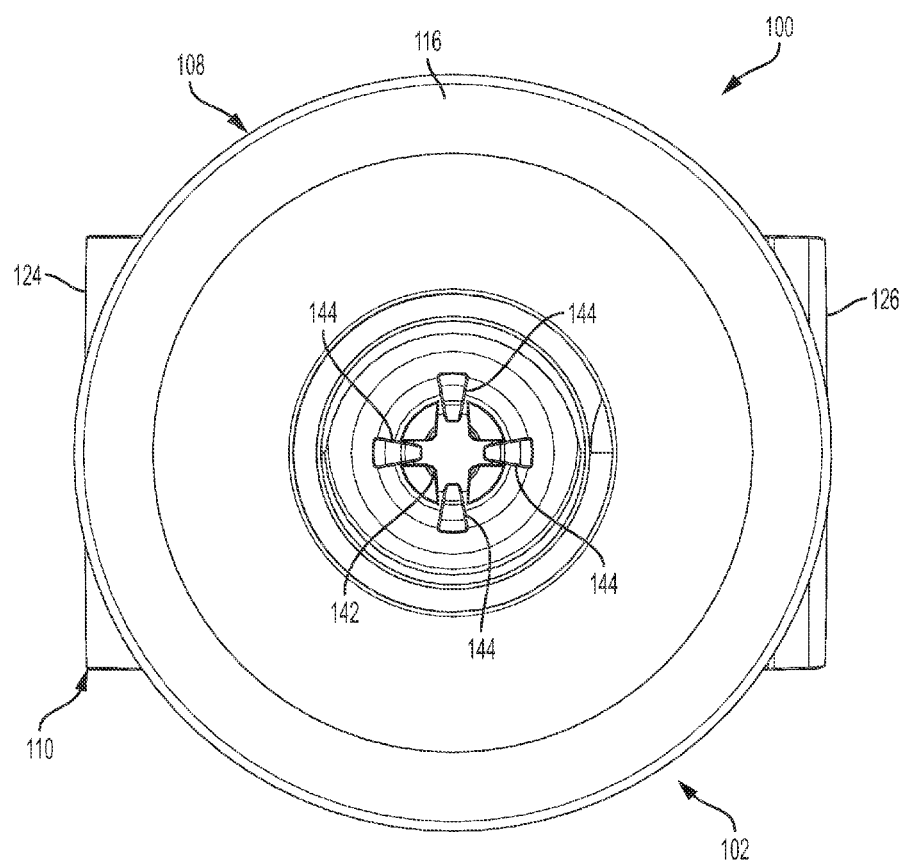
FIG. 8 is a top view of the fitting of FIG. 1.
Figure 9:
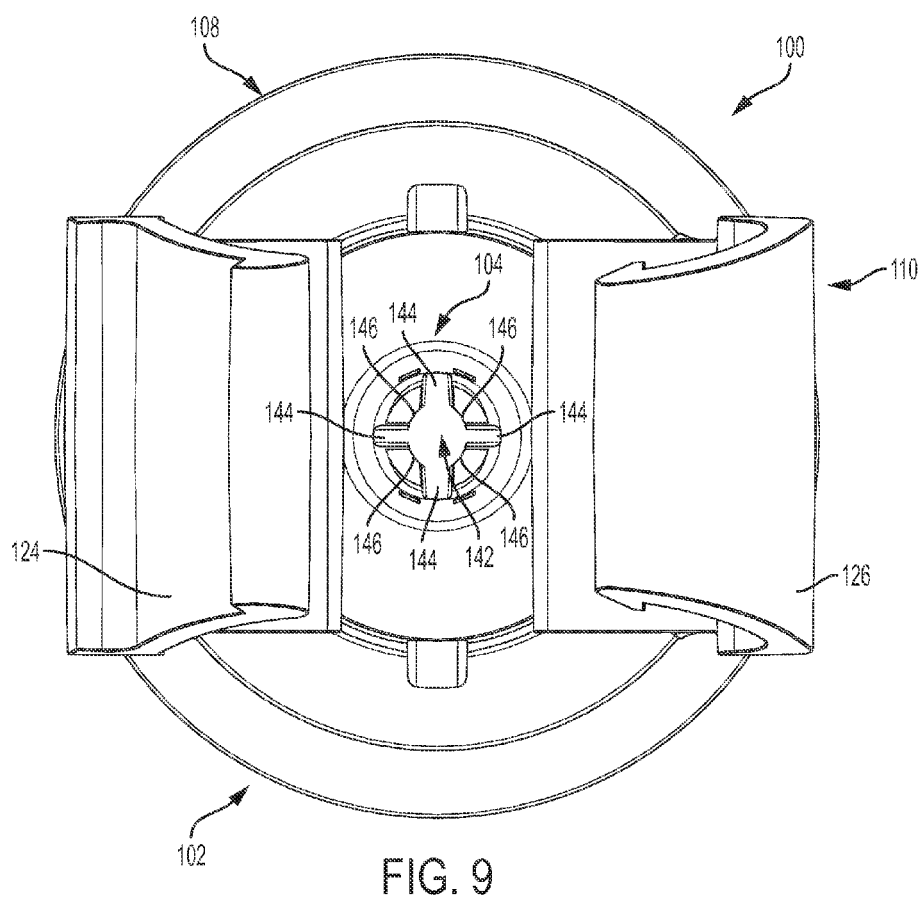
FIG. 9 is a bottom view of the fitting of FIG. 1.
Figure 10:
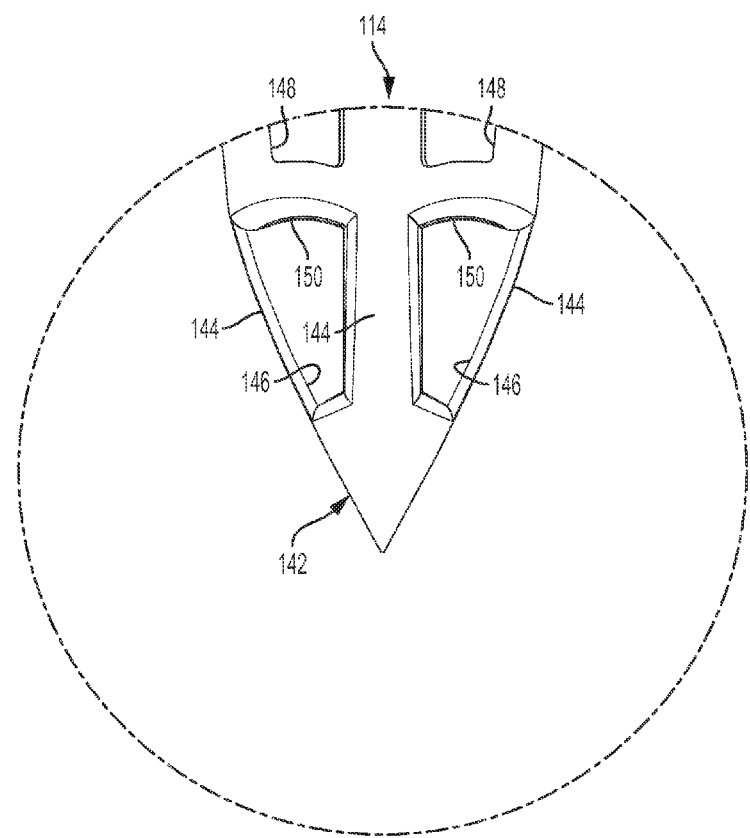
FIG. 10 is an enlarged side view of a tip portion of a tap of the fitting of FIG. 1.
Figure 11:
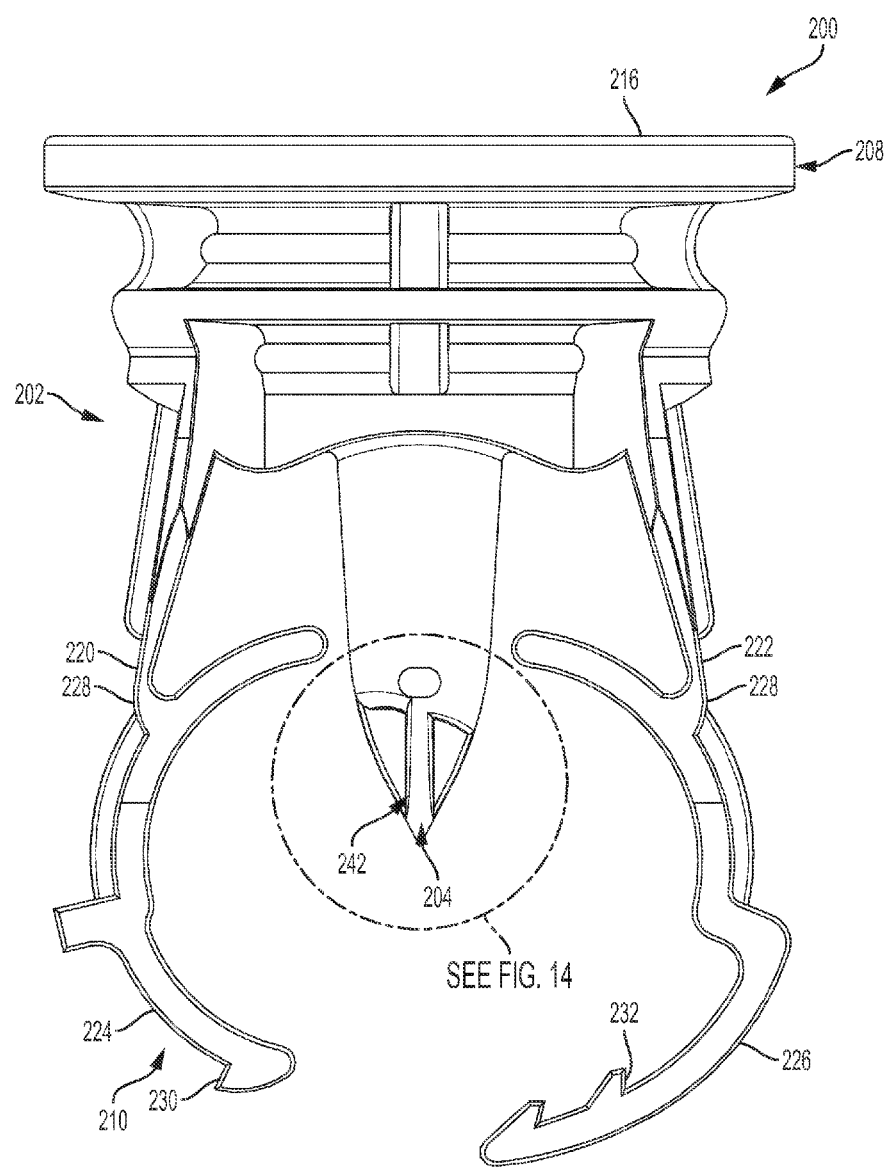
FIG. 11 is a front view of another exemplary embodiment of a fitting of the present disclosure.
Figure 12:
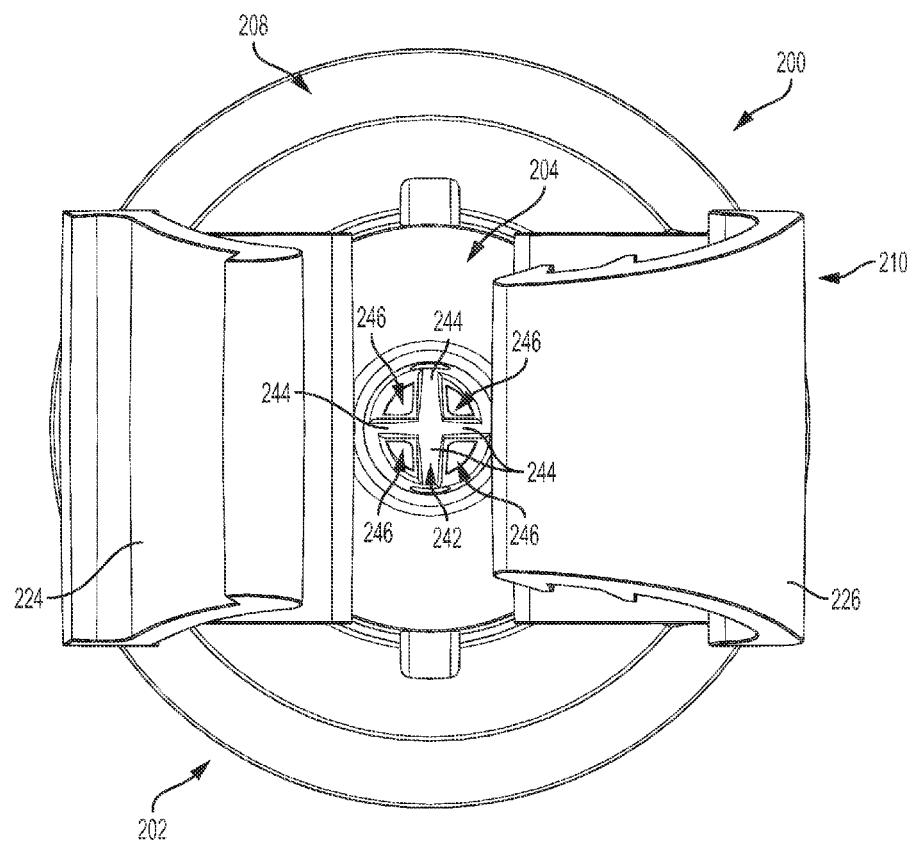
FIG. 12 is a bottom view of the fitting of FIG. 11.
Figure 13:
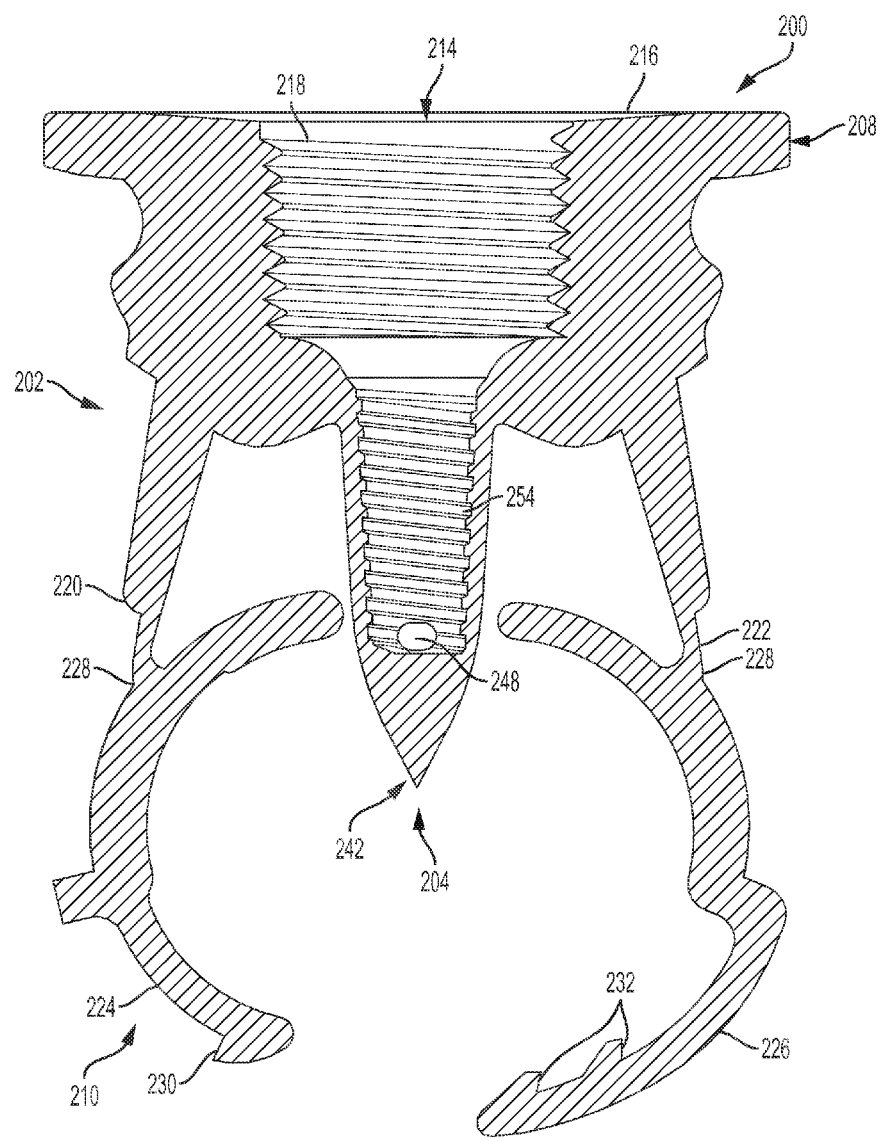
FIG. 13 is a longitudinal section view of the fitting of FIG. 11.

With reference now to FIGS. 8-10, the tap 104 of the fitting 100 extends generally downward from the body 108 of the saddle 102, between the arms 120, 122 of the saddle 102, and includes (or defines) part of the channel 114. The channel 114 extends generally through the tap 104, from the body 108 of the saddle 102 to a tip 142 of the tap 104, such that fluid can flow through the channel 114 from the tip 142 of the tap 104 to the body 108 of the saddle 102. Uniquely, the saddle 102 and the tap 104 both define at least part of the channel 114 (as opposed to other known fittings in which the tap 104 is positioned within the saddle 102 and defines the entire channel 114).

The illustrated tap 104 is generally linear and cylindrical in shape (although, as previously described, other shapes may be used within the scope of the present disclosure), and includes the generally spike-shaped, pointed tip 142. This configuration helps facilitate pressing, pushing, etc. movement of the tap 104 in the main line 103 (i.e., helps allow the tap 104 to be press-fit into and pierce the main line 103, as opposed to requiring rotation or other movements of the tap 104 for installation as in conventional fittings).

The spike-shaped tip 142 of the tap 104 generally includes a cross support. In the illustrated embodiment, the cross support is generally defined by four dividing members 144. And, an angle between adjacent ones of the dividing members 144 is about 90 degrees. As such, the dividing members 144 define a generally cross shape when viewed, for example, from above (FIG. 8) or from below (FIG. 9). In other exemplary embodiments, fittings may include taps with tips defining cross supports formed by other configurations of dividing members (e.g., configurations having two dividing members, three dividing members, five dividing members, greater than five dividing members, etc.).

In the illustrated fitting 100, the dividing members 144 of the tap's cross support are integrally formed, and define a generally solid mass of material at a vertex of the tip 142. This solid construction of the tip 142 adds strength to the tap 104, and helps with piercing the main line 103 when pushing the tap 104 into the main line 103 (as compared to traditional taps in which tips are generally hollow and generally weak). This solid construction of the tip 142 also allows a sidewall of the tap 104 to be substantially thinner than in conventional taps, such that the tap 104 can actually be smaller in size (e.g., in diameter, etc.) (and, thus, easier to push through the main line 103) and still accommodate a desired flow of fluid therethrough (as compared to conventional taps used to accommodate the same fluid flow, which are generally thicker in order to accommodate the same fluid flow). As such, the cross support feature included in the illustrated fitting 100 allows the tap 104 to be pushed by hand into the main line 103 (without crushing the main line 103), while also accommodating sufficient fluid flow through the tap 104 (from the main line 103) to activate/operate one or more devices coupled to the fitting 100 (e.g., the sprinkler head 107, etc.). For example, in some embodiments, the fitting 100 is capable of accommodating fluid flow through the fitting 100 of at least about 4 gallons per minute. In some embodiments, the fitting 100 is capable of accommodating fluid flow through the fitting 100 of at least about 4.5 gallons per minute. And, in some embodiments, the fitting 100 is capable of accommodating fluid flow through the fitting 100 of at least about 5 gallons per minute.

Also in the illustrated fitting 100, the cross support of the tap 104 defines multiple windows 146 that allow fluid to flow into the tip 142, through the windows 146, and into the channel 114 extending through the tap 104 (e.g., from the main line 103 when the fitting 100 is coupled to the main line 103, etc.). In the illustrated embodiment, four windows 146 are formed generally between the four dividing members 144. And, each window 146 extends about 90 degrees around the tip 142 of the tap 104, etc. Each of the windows 146 is also generally quadrilateral in shape (although other shapes may be used within the scope of the present disclosure, for example, triangular shapes, polygonal shapes, rounded shapes, etc.). The illustrated tap 104 also includes four windows 148 (broadly, inlets) defined generally above the tip 142. The windows 148 allow additional fluid to flow into the tip 142 and into the channel 114 extending through the tap 104 (e.g., from the main line 103 when the fitting 100 is coupled to the main line 103, etc.). All of the windows 146, 148 included in the tap 104 help ensure that sufficient fluid flows through the fitting 100 for operating a component coupled thereto (e.g., to cause the sprinkler head 107 to raise for dispersing water, etc.). With that said, it should be appreciated that different numbers of windows 146, 148 may be used, for example, to help ensure that sufficient fluid flows through the fitting 100 for operating a component coupled thereto.

In addition, each of the windows 146 defined by the cross support of the tap 104 includes an upper edge portion 150 (as viewed in FIG. 10) that is generally arching, rounded, etc. in shape. The edge portions of each of the windows 146 are also beveled in shape generally outwardly of the tap 104. This configuration of the windows 148 (and particularly the arching, rounded, etc. shape of the upper edge portion 150 of each of the windows 148) helps reduce friction at a point of contact of the tap 104 with the main line 103 (e.g., as compared to taps having similar windows with generally straight or square upper edge portions, etc.). For example, the arching, rounded, etc. shape of the upper edge portion 150 of each of the windows 148 generally results in less abrupt points of contact of the tap 104 with the main line 103 and, therefore, inhibits requiring hard cuts to be made at the windows 148 to pierce the main line 103. In turn, these features help improve ability of the tap 104 to be pushed through, and pierce, the main line 103 using only the strength of the user pushing the tap 104 generally straight into the main line 103 (generally without rotating or threading it).

Further, the illustrated tap 104 is generally tapered in shape to help facilitate sealing the tap 104 with, against, etc. the main line 103 when establishing the fluid communication (e.g., for polyethylene pipes, etc.). However, the tap 104 could alternatively be generally strait (with no taper). In addition, in some embodiments a seal (e.g., a rubber grommet, a plastic grommet, an O-ring, etc.) may also, or alternatively, be provided around the tap 104 to help facilitate sealing the tap 104 with, against, etc. the main line 103 (e.g., such that the seal is positioned against an outer surface of the main line 103 when the fitting 100 is installed to the main line 103, etc.) (e.g., for polyethylene pipes, polyvinyl chloride pipes, etc.).

FIGS. 11-14 illustrate another exemplary embodiment of a fitting 200 including one or more aspects of the present disclosure. The fitting 200 is substantially the same as the fitting 100 previously described and illustrated in FIGS. 1-10. As such, the prior description of the fitting 100 herein also generally applies to corresponding parts of the fitting 200 of this embodiment (taking into account the following description of the fitting 200). In addition, it should be appreciated that the fitting 200 of this embodiment may similarly be used in irrigation systems or otherwise, in similar fashion to that described for the fitting 100.

With that said, the fitting 200 generally includes a saddle 202 and a tap 204 extending generally downwardly from the saddle 202. The saddle 202 and the tap 204 of the illustrated fitting 200 are formed as a single structure. And, the fitting 200 can be press-fit (e.g., manually by users, etc.) onto a pipe to establish fluid connection, without threading or rotating the fitting 200 (or any portion thereof, such as the tap 204 relative to the saddle 202) in order to install the fitting 200 to the pipe.

The saddle 202 of the fitting 200 includes a body 208 and a clamp 210. The body 208 is generally short and tubular in shape. And, a channel 214 (FIG. 13) is defined by both the body 208 and the tap 204 to provide fluid communication through the fitting 200. An upper end portion of the channel 214, located toward an upper surface 216 of the body 208, includes threads 218 to couple one or more other devices to the fitting 200, for example, via a connector, etc., to establish the fluid communication between the fitting 200 and the one or more other devices. A lower end portion of the channel 214, defined generally by the tap 204, also includes threads 254 that are smaller than the upper threads 218 to receive a different size connector, as desired. In addition, the upper surface 216 of the body 208 is also broad and substantially flat, to help facilitate manually pushing the fitting 200 (via the upper surface 216) into connection with a pipe.

The clamp 210 of the fitting 200 is disposed generally below the body 208, and operates to hold the fitting 200 on a pipe. The clamp 210 includes first and second arms 220, 222 extending generally away from the body 208, and jaw portions 224, 226 coupled to the arms 220, 222. The jaw portions 224, 226 are each generally arcuate in shape, and are each coupled to corresponding arms 220, 222 by hinges 228. This allows the jaw portions 224, 226 to move, flex, etc. relative to the arms 220, 222 when positioning a pipe between the jaw portions 224, 226. Lips 230, 232 are provided on lower end portions of the jaw portions 224, 226 for use in holding, securing, etc. the jaw portions 224, 226 together when coupling the saddle 202 to the pipe.

In this embodiment, the tap 204 of the fitting 200 includes a generally spike-shaped, pointed tip 242 that is somewhat different from the tip 242 of the fitting 200.

The spike-shaped tip 242 of the tap 204 includes a cross support generally defined by four dividing members 244. And, an angle between adjacent ones of the dividing members 244 is about 90 degrees. As such, the dividing members 244 define a generally cross shape when viewed, for example, from above or from below (see FIG. 12). The cross support helps provide strength to the tip 242 of the tap 204. In other exemplary embodiments, and as previously described, fittings may include taps with tips defining cross supports formed by other configurations of dividing members (e.g., configurations having two dividing members, three dividing members, five dividing members, greater than five dividing members, etc.).

The dividing members 244 of the tap's cross support are integrally formed, and define a generally solid mass of material at a vertex of the tip 242. This solid construction of the tip 242 adds strength to the tap 204, and helps with piercing a pipe when pushing the tap 204 into the pipe (as compared to traditional taps in which tips are generally hollow and generally weak). This solid construction of the tip 242 also allows a sidewall of the tap 204 to be substantially thinner than in conventional taps, such that the tap 204 can actually be smaller in size (e.g., in diameter, etc.) (and, thus, easier to push through a pipe) and still accommodate a desired flow of fluid therethrough (as compared to conventional taps used to accommodate the same fluid flow, which are generally thicker in order to accommodate the same fluid flow). As such, the cross support feature included in the illustrated fitting 200 helps allow the tap 204 to be pushed by hand into a pipe (without crushing the pipe), while also accommodating sufficient fluid flow through the tap 204 (from the pipe) to activate/operate one or more devices coupled to the fitting 200.

Figure 14:
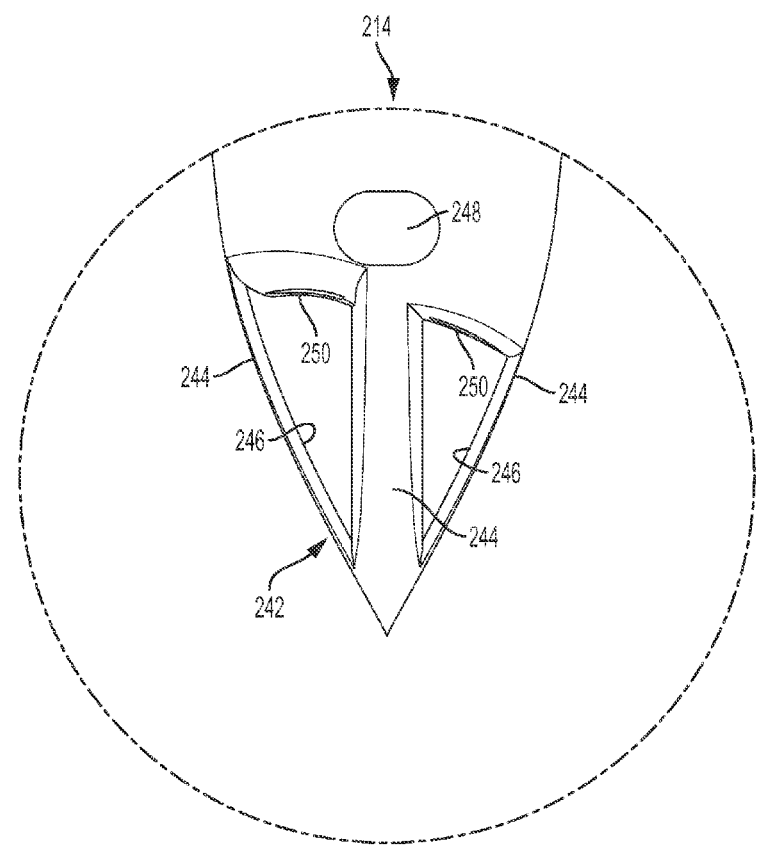
FIG. 14 is an enlarged side view of a tip portion of a tap of the fitting of FIG. 11.

In addition, the cross support of the tap 204 defines windows 246 that allow fluid to flow into the tip 242, through the windows 246, and into the channel 214 extending through the tap 204 (e.g., from a pipe when the fitting 200 is coupled to the pipe, etc.). In the illustrated embodiment, four windows 246 are formed generally between the four dividing members 244. Two of the windows 246 are shown in FIG. 14, with it understood that the windows 246 on the opposite side of the tap 204 are a mirror image of the windows 246 shown in FIG. 14 (although such similarity is not required in all embodiments). And, each window 246 extends about 90 degrees around the tip 242 of the tap 204, etc. Each of the windows 246 is also generally triangular in shape (although other shapes may be used within the scope of the present disclosure, for example, quadrangular shapes, polygonal shapes, rounded shapes, etc.). The illustrated tap 204 also includes two inlets 248 defined generally above the tip 242 and disposed on generally opposite sides of the tip 242 (and in fluid communication with the windows 246 and channel 214). The inlets 248 allow additional fluid to flow into the tip 242 and the channel 214 extending through the tap 204 (e.g., from a pipe when the fitting 200 is coupled to the pipe, etc.), and help ensure that sufficient fluid flows through the fitting 200 for operating a component coupled thereto. For example, in some embodiments, the fitting 200 is capable of accommodating fluid flow through the fitting 200 of at least about 4 gallons per minute. In some embodiments, the fitting 200 is capable of accommodating fluid flow through the fitting 200 of at least about 4.5 gallons per minute. And, in some embodiments, the fitting 200 is capable of accommodating fluid flow through the fitting 200 of at least about 5 gallons per minute.

Each of the windows 246 defined by the cross support of the tap 204 includes an upper edge portion 250 (as viewed in FIG. 14) that is generally sloped or angled or slanted in shape or orientation (e.g., sloping from left to right as viewed in FIG. 14, etc.). And, a lower portion of each of the windows 246 is generally narrowed toward the tip 242 of the tap 204 (defining the generally triangular shape). As such, as viewed in FIG. 14, the right window 246 is generally smaller in size than the left widow 246 (this relation is also true for the windows 246 on the opposite side of the tap 204). The edge portions of each of the windows 246 may also be beveled in shape generally outwardly of the tap 204.

This configuration of the cross support of the tap 204 helps reduce friction at a point of contact of the tap 204 with a pipe. For example, the sloping or angling or slanting shape of the upper edge portion 250 of each of the windows 246 generally results in less abrupt points of contact of the tap 204 with the pipe and, therefore, inhibits requiring hard cuts to be made at the windows 246 to pierce the pipe. In turn, this configuration of the cross support may help improve ability of the tap 204 to be pushed through, and pierce, the pipe using only the strength of the user pushing the tap 204 generally straight into the pipe (generally without rotating or threading it).

Further, the illustrated tap 204 is generally tapered in shape to help facilitate sealing the tap 204 with, against, etc. a pipe when establishing the fluid communication (e.g., for polyethylene pipes, etc.). However, the tap 204 could alternatively be generally strait (with no taper). In addition, in some embodiments a seal (e.g., a rubber grommet, a plastic grommet, an O-ring, etc.) may also, or alternatively, be provided around the tap 204 to help facilitate sealing the tap 204 with, against, etc. a pipe (e.g., such that the seal is positioned against an outer surface of the pipe when the fitting 200 is installed to the pipe, etc.) (e.g., for polyethylene pipes, polyvinyl chloride pipes, etc.).

Figure 15:
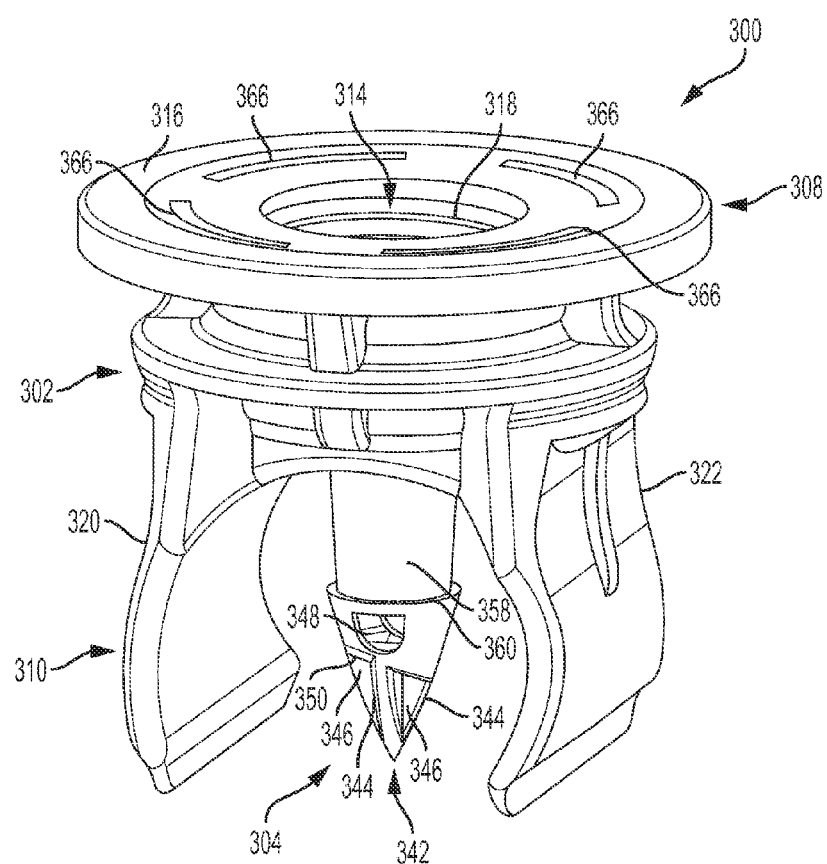
FIG. 15 is a perspective view of another exemplary embodiment of a fitting of the present disclosure.
Figure 16:
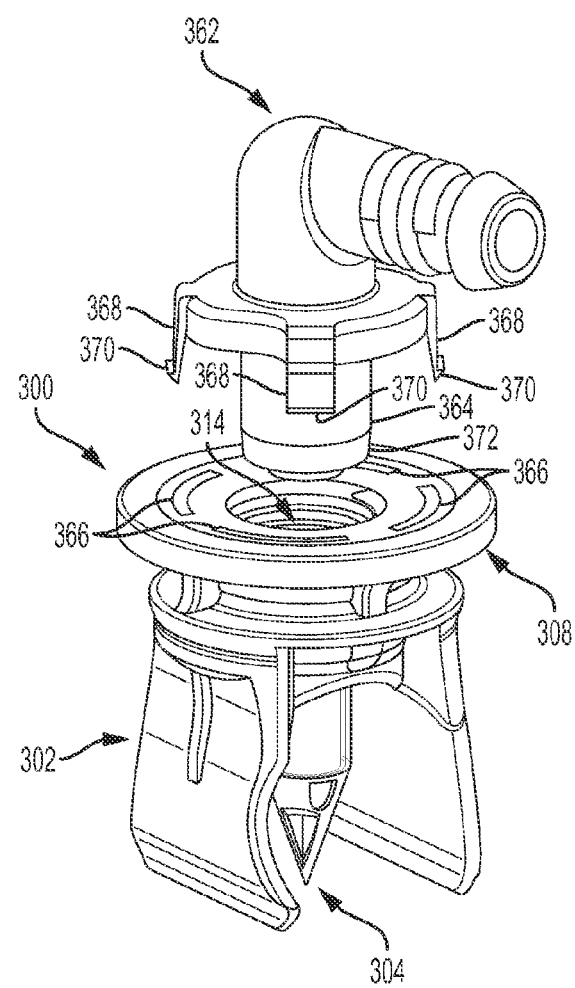
FIG. 16 is a perspective view of the fitting of FIG. 15 shown installed to a pipe, and with a connector shown generally above the fitting suitable for coupling to the fitting.
Figure 17:
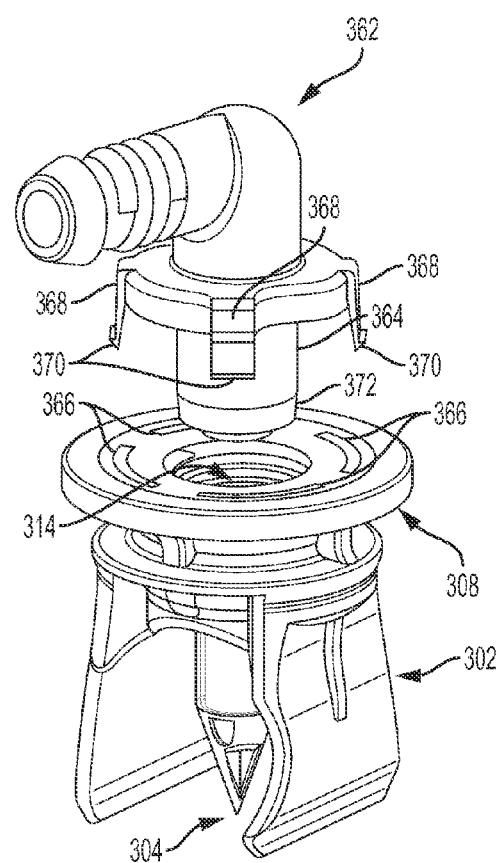
FIG. 17 is another perspective view of the fitting and the connector of FIG. 16.

FIGS. 15-17 illustrate another exemplary embodiment of a fitting 300 including one or more aspects of the present disclosure. The fitting 300 is substantially the same as the fittings 100, 200 previously described and illustrated in FIGS. 1-10 and FIGS. 11-14. As such, the prior description of the fittings 100, 200 herein also generally apply to corresponding parts of the fitting 300 of this embodiment. In addition, it should be appreciated that the fitting 300 of this embodiment may similarly be used in irrigation systems or otherwise, in similar fashion to that described for the fittings 100, 200.

With that said, the fitting 300 generally includes a saddle 302 and a tap 304 extending generally downwardly from the saddle 302. The saddle 302 and the tap 304 of the illustrated fitting 300 are formed as a single structure. And, the fitting 300 can be press-fit (e.g., manually by users, etc.) onto a pipe to establish fluid connection, without threading or rotating the fitting 300 (or any portion thereof, such as the tap 304 relative to the saddle 302) in order to install the fitting 300 to the pipe.

The saddle 302 of the fitting 300 includes a body 308 and a clamp 310. The body 308 is generally short and tubular in shape. And, a channel 314 is defined by both the body 308 and the tap 304 to provide fluid communication through the fitting 300. An upper end portion of the channel 314, located toward an upper surface 316 of the body 308, includes threads 318 to couple one or more other devices to the fitting 300, for example, via a connector, etc., to establish the fluid communication between the fitting 300 and the one or more other devices. In addition, the upper surface 316 of the body 308 is also broad and substantially flat, to help facilitate manually pushing the fitting 300 (via the upper surface 316) into connection with a pipe.

The clamp 310 of the fitting 300 is disposed generally below the body 308, and operates to support the fitting 300 on a pipe, for example, when inserting the tap 304 into the pipe. In this embodiment, the clamp 310 includes first and second arms 320, 322 extending generally away from the body 308 (but does not include jaw portions coupled to the arms 320, 322). The arms 320, 322 are each generally arcuate in shape, and are each coupled to the body 308 so that the arms 320, 322 can slightly move, flex, etc. relative to the body 308 when positioning a pipe between the arms 320, 322. The arms 320, 322 operate to support a pipe, when installing the fitting 300 to the pipe, and help maintain a rounded shape of the pipe when inserting the tap 304 into the pipe (e.g., to help inhibit the pipe from flattening out when inserting the tap 304, etc.). And, when the fitting 300 is installed to a pipe, the arms 320, 322 help support the fitting 300 against rotation or other movement relative to the pipe, for example, when coupling a connector to the fitting 300, etc.

The tap 304 of the fitting 300 includes a generally spike-shaped, pointed tip 342 that is similar to the tip 242 of the fitting 200. In particular, the spike-shaped tip 342 includes a cross support generally defined by four dividing members 344. And, an angle between adjacent ones of the dividing members 344 is about 90 degrees. As such, the dividing members 344 define a generally cross shape when viewed, for example, from above or from below. The cross support helps provide strength to the tip 342 of the tap 304.

The dividing members 344 of the tap's tip 342 are integrally formed, and define a generally solid mass of material at a vertex of the tip 342. This solid construction of the tip 342 adds strength to the tap 304, and helps with piercing a pipe when pushing the tap 304 into the pipe (as compared to traditional taps in which tips are generally hollow and generally weak). This solid construction of the tip 342 also allows a sidewall of the tap 304 to be substantially thinner than in conventional taps, such that the tap 304 can actually be smaller in size (e.g., in diameter, etc.) (and, thus, easier to push through a pipe) and still accommodate a desired flow of fluid therethrough (as compared to conventional taps used to accommodate the same fluid flow, which are generally thicker in order to accommodate the same fluid flow). As such, the cross support feature included in the illustrated fitting 300 helps allow the tap 304 to be pushed by hand into a pipe (without crushing the pipe), while also accommodating sufficient fluid flow through the tap 304 (from the pipe) to activate/operate one or more devices coupled to the fitting 300.

In addition, the cross support of the tap's tip 342 defines windows 346 that allow fluid to flow into the tip 342, through the windows 346, and into the channel 314 extending through the tap 304 (e.g., from a pipe when the fitting 300 is coupled to the pipe, etc.). In the illustrated embodiment, four windows 346 are formed generally between the four dividing members 344. Two of the windows 346 are shown in FIGS. 15 and 16, with it understood that the windows 346 on the opposite side of the tap 304 (as shown in FIG. 17) are a mirror image of the windows 346 shown in FIGS. 15 and 16 (although such similarity is not required in all embodiments). And, each window 346 extends about 90 degrees around the tip 342 of the tap 304, etc. Each of the windows 346 is also generally triangular in shape (although other shapes may be used within the scope of the present disclosure, for example, quadrangular shapes, polygonal shapes, rounded shapes, etc.). The illustrated tap 304 also includes two inlets 348 defined generally above the tip 342 and disposed on generally opposite sides of the tip 342 (and in fluid communication with the windows 346 and channel 314). The inlets 348 allow additional fluid to flow into the tip 342 and the channel 314 extending through the tap 304 (e.g., from a pipe when the fitting 300 is coupled to the pipe, etc.), and help ensure that sufficient fluid flows through the fitting 300 for operating a component coupled thereto. For example, in some embodiments, the fitting 300 is capable of accommodating fluid flow through the fitting 300 of at least about 4 gallons per minute. In some embodiments, the fitting 300 is capable of accommodating fluid flow through the fitting 300 of at least about 4.5 gallons per minute. And, in some embodiments, the fitting 300 is capable of accommodating fluid flow through the fitting 300 of at least about 5 gallons per minute.

Each of the windows 346 defined by the cross support of the tap 304 includes an upper edge portion 350 (as viewed in FIG. 15) that is generally sloped or angled or slanted in shape (e.g., sloping from left to right as viewed in FIG. 15, etc.). And, a lower portion of each of the windows 346 is generally narrowed toward the tip 342 of the tap 304 (defining the generally triangular shape). As such, as viewed in FIG. 15, the right window is generally smaller in size than the left widow (this relation is also true for the windows 346 on the opposite side of the tap 304). The edge portions of each of the windows 346 may also be beveled in shape generally outwardly of the tap 304.

This configuration of the cross support of the tap 304 helps reduce friction at a point of contact of the tap 304 with a pipe. For example, the sloping or angling shape of the upper edge portion 350 of each of the windows 346 generally results in less abrupt points of contact of the tap 304 with the pipe and, therefore, inhibits requiring hard cuts to be made at the windows 346 to pierce the pipe. In turn, this configuration of the cross support may help improve ability of the tap 304 to be pushed through, and pierce, the pipe using only the strength of the user pushing the tap 304 generally straight into the pipe (generally without rotating or threading it).

With continued reference to FIGS. 15-17, in the illustrated embodiment, the tip 342 of the tap 304 of the fitting 300 defines a generally barbed configuration. In particular, an upper portion of the tip 342 (as viewed in FIG. 15) is generally larger in diameter than a body 358 of the tap 304, and defines a barb or ledge 360 generally above the inlets 348. In use, when the tap 304 is inserted into a pipe, the tip 342 extends into the pipe, and the barb or ledge 360 may then be configured to engage an inner surface of the pipe to help secure (e.g., lock, hold, etc.) the fitting 300 on the pipe and help inhibit inadvertent removal of the fitting 300 from the pipe. In so doing, the barb 360 also helps maintain the windows 346 and the inlets 348 within the pipe, to thereby help maintain adequate fluid communication between the pipe and the fitting 300. Further, the body 308 of the tap 304 is generally tapered in shape to help facilitate sealing the tap 304 with, against, etc. a pipe when establishing the fluid communication (e.g., for polyethylene pipes, etc.). However, the tap 304 could alternatively be generally strait (with no taper). In addition, in some embodiments a seal (e.g., a rubber grommet, a plastic grommet, an O-ring, etc.) may also, or alternatively, be provided around the body 308 of the tap 304 to help facilitate sealing the tap 304 with, against, etc. a pipe (e.g., such that the seal is positioned against an outer surface of the pipe when the fitting 300 is installed to the pipe, etc.) (e.g., for polyethylene pipes, polyvinyl chloride pipes, etc.).

Also in the illustrated embodiment, and as shown in FIGS. 16 and 17, a connector 362 is provided for coupling to the fitting 300. In particular in this embodiment, the fitting 300 and the connector 362 are configured for making a quick-connect coupling therebetween (e.g., without using, or as an alternative to using, the conventional threads 318, etc.), when an inlet portion 364 of the connector 362 is positioned within an upper end portion of the channel 314 of the fitting 300. While the connector 362 is shown as a funny-pipe elbow connector, it should be appreciated that such quick-connect coupling may be used between the fitting 300 and any desired style of connector within the scope of the present disclosure.

To facilitate the coupling between the fitting 300 and the connector 362, the upper surface 316 of the body 308 of the fitting 300 includes slots 366 (broadly, openings) positioned generally around a perimeter of the upper surface 316 of the body 308, and the connector 362 includes corresponding tabs 368 configured to snap-fit within the slots 366. In particular, the tabs 368 include protrusions 370 that extend through the slots 366 and position generally below the upper surface 316 of the fitting body 308 when the connector 362 is positioned on the fitting 300, to help secure the connector 362 on the fitting 300. The connector 362 also includes a seal 372 (e.g., a rubber grommet, a plastic grommet, an O-ring, etc.) disposed around the inlet portion 364 thereof. When the protrusions 370 are located generally below the upper surface 316 of the body 308, the seal 372 is moved into position against an inner portion of the fitting channel 314 to further help facilitate sealing the connector 362 with, against, etc. the fitting 300. The connector 362 can then be removed from the fitting 300, as desired, by manipulating the protrusions 370 and moving the tabs 368 out of the slots 366.

In the illustrated embodiment, the upper surface 316 of the fitting body 308 includes four slots 366 and the connector 362 includes four tabs 368. In other embodiments, however, in connection with providing quick-connect couplings between fittings and connectors, the fittings may include bodies with more than or less than four slots for receiving tabs of the connectors, and/or the connectors may include more than or less than four tabs for mating with slots of the fittings. In addition, in other embodiments, in connection with providing quick-connect couplings between fittings and connectors, the fittings may include tabs extend therefrom and the connectors may include slots configured to receive the tabs of the fittings therein (e.g., in a snap-fit manner, etc.). Further, in other embodiments, other quick-connect features may be used to couple fittings and connectors, for example, tabs and slots configured to lock, secure, etc. when the tabs slide into the slots, etc.

Figure 18:
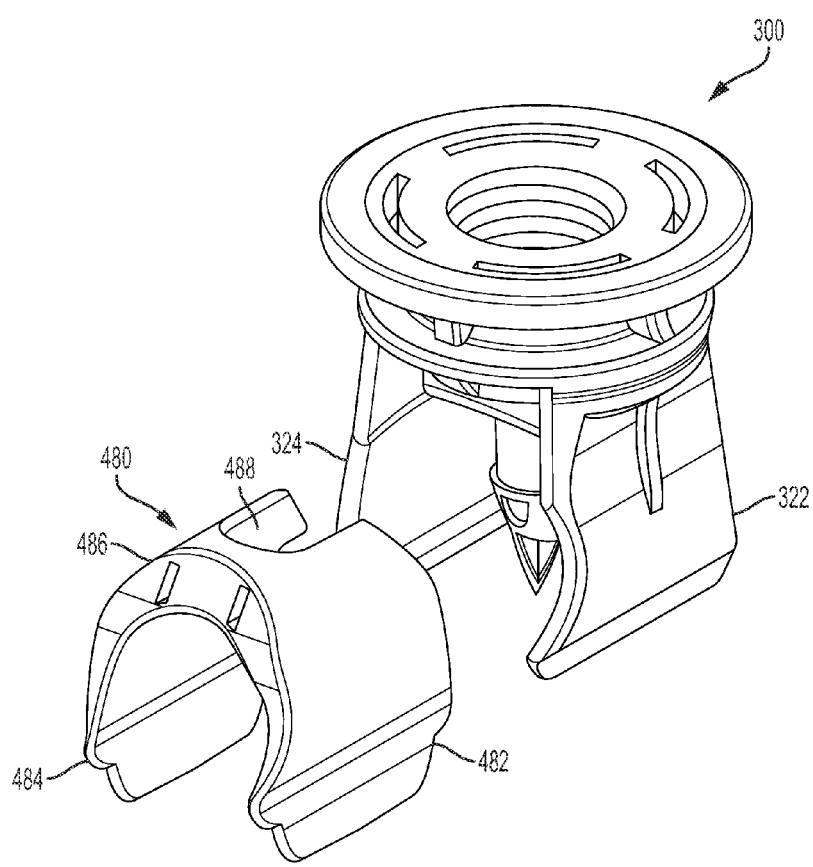
FIG. 18 is a perspective view of an exemplary embodiment of a spacer suitable for use in coupling a fitting of the present disclosure to a pipe.

FIG. 18 illustrates an exemplary embodiment of a spacer 480 suitable for use with the fitting 300 of FIGS. 15-17, and including one or more aspects of the present disclosure. The spacer 480 is configured to allow the fitting 300 to be used with different sizes of pipes. While the spacer 480 is described in connection with the fitting 300, it should be appreciated that the spacer 480 can also be used with other ones of the fittings described herein (e.g., fitting 100, fitting 200, fitting 500, etc.).

The illustrated spacer 480 generally includes first and second arms 482, 484 extending generally away from a body 486. The arms 482, 484 are each generally arcuate in shape, and are each coupled to the body 486 so that the arms 482, 484 can slightly move, flex, etc. relative to the body 486 when positioning the spacer 480 over a pipe (and when positioning the pipe between the arms 482, 484). The arms 482, 484 operate to secure the spacer 480 on the pipe, help inhibit unwanted movement of the space relative to the pipe.

In use, the spacer 480 is coupled to a pipe, with the pipe positioned generally between the arms 482, 484 of the spacer 480. And, the fitting 300 is then positioned over the spacer 480 and pressed onto the pipe, in the manner previously described. In so doing, the arms 320, 322 of the fitting 300 generally align with the arms 482, 484 of the spacer 480, and the tap 304 of the fitting 300 generally extends through an opening 488 defined by the body 486 of the spacer 480. Thus, the spacer 480 can allow the fitting 300 to be used with a smaller diameter pipe than potentially accommodated by the fitting 300 alone.

Figure 19:
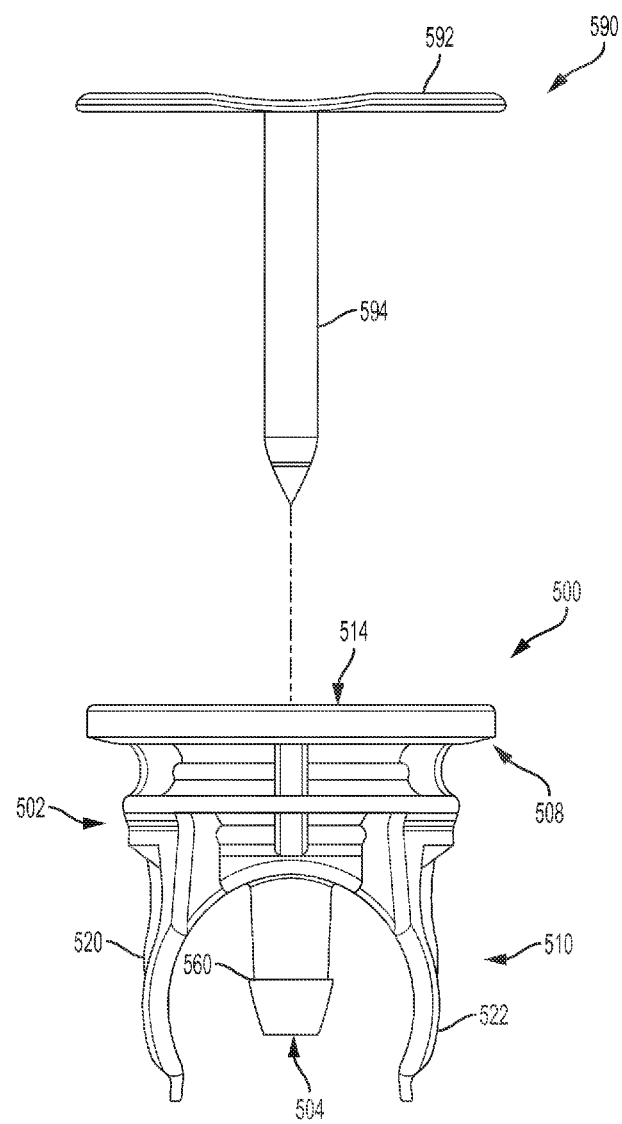
FIG. 19 is a front view of another exemplary embodiment of a fitting of the present disclosure.

FIG. 19 illustrates another exemplary embodiment of a fitting 500 including one or more aspects of the present disclosure. The fitting 500 is similar to the fitting 300 previously described and illustrated in FIGS. 15-17. As such, the prior description of the fitting 300 (as well as the descriptions of the fittings 100, 200) herein also generally applies to corresponding parts of the fitting 500 of this embodiment. In addition, it should be appreciated that the fitting 500 of this embodiment may similarly be used in irrigation systems or otherwise, in similar fashion to that described for the fittings 100, 200, 300.

With that said, the fitting 500 generally includes a saddle 502 and a tap 504 extending generally downwardly from the saddle 502. The saddle 502 and the tap 504 of the illustrated fitting 500 are formed as a single structure. And, the fitting 500 can be press-fit onto a pipe using a press 590 to establish fluid connection, without threading or rotating the fitting 500, or without threading or rotating the tap 504 relative to the saddle 502, or without treading or rotating the press 590.

The saddle 502 of the fitting 500 includes a body 508 and a clamp 510. The body 508 is generally short and tubular in shape. And, a channel 514 is defined by both the body 508 and the tap 504 to provide fluid communication through the fitting 500. An upper end portion of the channel 514, located toward an upper surface of the body 508, may include threads to couple one or more other devices to the fitting 500, for example, via a connector, etc., to establish the fluid communication between the fitting 500 and the one or more other devices. Additionally, or alternatively, the upper surface of the body 508 may include slots to facilitate a quick-connect coupling between the fitting 500 and one or more other devices (such as described for fitting 300).

The clamp 510 of the fitting 500 is disposed generally below the body 508, and operates to support the fitting 500 on a pipe, for example, when inserting the tap 504 into the pipe. The clamp 510 includes first and second arms 520, 522 extending generally away from the body 508 (but does not include jaw portions coupled to the arms 520, 522). The arms 520, 522 are each generally arcuate in shape, and are each coupled to the body 508 so that the arms 520, 522 can slightly move, flex, etc. relative to the body 508 when positioning a pipe between the arms 520, 522. The arms 520, 522 operate to support a pipe, when installing the fitting 500 to the pipe, and help maintain a rounded shape of the pipe when inserting the tap 504 into the pipe (e.g., to help inhibit the pipe from flattening out when inserting the tap 504, etc.). And, when the fitting 500 is installed to a pipe, the arms 520, 522 help support the fitting 500 against rotation or other movement relative to the pipe, for example, when coupling a connector to the fitting 500, etc.

In this embodiment, the tap 504 of the fitting 500 does not include a spike-shaped tip. Instead, a lower portion of the tap 504 is generally open, and defines a generally lower portion of the channel 514 extending through the fitting 500. In addition, the lower portion of the tap 504 defines a generally barbed configuration. In particular, the tap 504 defines a barb or ledge 560 generally above the open end portion. In use, when the tap 504 is inserted into a pipe, the open end portion extends into the pipe, and the barb or ledge 560 may then be configured to engage an inner surface of the pipe to help secure (e.g., lock, hold, etc.) the fitting 500 on the pipe and help inhibit inadvertent remove of the fitting 500 from the pipe. Further, the body 508 of the tap 504 is generally tapered in shape to help facilitate sealing the tap 504 with, against, etc. a pipe when establishing the fluid communication (e.g., for polyethylene pipes, etc.). However, the tap 504 could alternatively be generally strait (with no taper). In addition, in some embodiments a seal (e.g., a rubber grommet, a plastic grommet, an O-ring, etc.) may also, or alternatively, be provided around the body 508 of the tap 504 to help facilitate sealing the tap 504 with, against, etc. a pipe (e.g., such that the seal is positioned against an outer surface of the pipe when the fitting 500 is installed to the pipe, etc.) (e.g., for polyethylene pipes, polyvinyl chloride pipes, etc.).

Further in this embodiment, the press 590 includes a handle portion 592 and a spike 594 extending away from the handle portion 592. In use, the spike 594 of the press 590 is positioned through the channel 514 of the of the fitting 500, with a pointed tip of the spike 594 extending through the open end portion of the fitting 500. The fitting 500 and press 590 are then positioned over a pipe, and the handle portion 592 of the press 590 is pushed against the fitting 500 so that the pointed tip pierces the pipe. The press 590 and fitting 500 are then further pushed toward the pipe to insert the tap 504 of the fitting 500 into the pipe through the opening made by the spike 594. The press 590 can then be removed from the fitting 500 by simply pulling the press 590 out of the channel 514 of the fitting 500. The handle portion 592 of the press 590 is generally broad and substantially flat, to help facilitate manually pushing the press 590 and fitting 500 into connection with a pipe.

It should be appreciated that other presses may be used in connection with installing the fitting 500 to a pipe, other than press 590. For example, presses utilizing two handles pivotally coupled together, with one of the handles including a spike for piercing a pipe, may be used, etc. (e.g., such as the Panther Drill from Prakor®, etc.).

As can be seen, the fittings of the present disclosure provide one piece fittings (e.g., one piece, one step, self-tapping spike press fittings; etc.) that can be coupled to and penetrated at least partly into pipes by a single step of hand pushing (and without requiring rotation of the taps, as in conventional fittings). The simple one step of pressing installation allows the taps to pierce the pipes without crushing the pipes. And in some aspects, the fittings are configured to have improved structures to allow enough water flow from the pipes to the lateral lines to help ensure that sufficient fluid flows through the fittings for operating component coupled thereto (e.g., at least about 4 gallons per minute, at least about 4.5 gallons per minute, at least about 5 gallons per minute, etc.).

As can also be seen, the cross supports of the taps (and their solid vertex portions), in the fittings herein having such cross supports, helps add strength to the tips of the taps as they pierce pipes. Spikes/taps in conventional fittings are completely hollow to maximize water flow. The fittings of the present disclosure are able to maximize water flow through the taps by having thinner walls, thereby not increasing the diameters of the taps and making it possible to push the taps into the pipes (instead of having to rotate the taps or thread the taps in order to pierce the pipes). Because the walls of the taps, in the present disclosure, are generally thinner, the solid construction of the vertex portions of the taps (and the cross support design, configuration, etc.) provides additional strength to the tap.

Further, in the fittings of the present disclosure, pushing the taps of the fittings into the pipes may create better seas between the fittings and the pipes, than between conventional fittings requiring rotation to be inserted into pipes. In conventional fittings, when rotating the fittings to pierce the pipes, the rotating operation may damage the pipe along the pierced edges of the pipe (e.g., due to friction, abrasion, etc.). As such, seals between the pipe and the fittings may be compromised and the pipes may leak at the points of connection. In contrast, by pushing the taps of the fittings directly into the pipes, as with the fittings of the present disclosure, potential damage resulting from friction or abrasion associated with conventional rotation may be inhibited.

Exemplary embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

Specific dimensions, specific materials, and/or specific shapes disclosed herein are example in nature and do not limit the scope of the present disclosure. The disclosure herein of particular values and particular ranges of values for given parameters are not exclusive of other values and ranges of values that may be useful in one or more of the examples disclosed herein. Moreover, it is envisioned that any two particular values for a specific parameter stated herein may define the endpoints of a range of values that may be suitable for the given parameter (i.e., the disclosure of a first value and a second value for a given parameter can be interpreted as disclosing that any value between the first and second values could also be employed for the given parameter). For example, if Parameter X is exemplified herein to have value A and also exemplified to have value Z, it is envisioned that parameter X may have a range of values from about A to about Z. Similarly, it is envisioned that disclosure of two or more ranges of values for a parameter (whether such ranges are nested, overlapping or distinct) subsume all possible combination of ranges for the value that might be claimed using endpoints of the disclosed ranges. For example, if parameter X is exemplified herein to have values in the range of 1-10, or 2-9, or 3-8, it is also envisioned that Parameter X may have other ranges of values including 1-9, 1-8, 1-3, 1-2, 2-10, 2-8, 2-3, 3-10, and 3-9.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A fitting assembly comprising:
a spacer comprising a body and generally arcuate arms extending away from the body, the spacer configured to couple to a pipe with the pipe positioned generally between the arms; and a fitting configured to couple to the spacer for use in making a fluid connection with the pipe, the fitting comprising:
   a saddle adapted to couple the fitting to the pipe generally over the spacer, the saddle including a clamp configured to secure the fitting to the spacer and/or the pipe;
   a tap integrally formed with the saddle and extending generally away from saddle, the tap configured to insert at least partly into the pipe for establishing the fluid connection with the pipe; and
   a passageway defined by the saddle and the tap, for receiving fluid from the pipe and into the fitting via the tap.

2. The assembly of claim 1, wherein the tap of the fitting includes a spike-shaped tip having a cross support defining multiple windows in the tap for establishing the fluid connection with the pipe.

3. The assembly of claim 2, wherein the multiple windows include four windows; and
   wherein the cross support includes four members defining the four windows.

4. The assembly of claim 3, wherein an angle between two adjacent members of the cross support is about 90 degrees.

5. The assembly of claim 2, wherein at least one of the multiple windows comprises an arch-shaped upper edge portion, for decreasing friction between the tap and the pipe at the cross support when inserting the tap into the pipe.

6. The assembly of claim 2, wherein at least one of the multiple windows comprises an upper edge portion that defines a sloping orientation, for decreasing friction between the tap and the pipe at the cross support when inserting the tap into the pipe.

7. The assembly of claim 1, wherein the saddle of the fitting includes a substantially flat upper surface, for use in pushing the fitting onto the pipe, the flat upper surface defining at least one slot opening for use in coupling a connector to the fitting.

8. The assembly of claim 7, wherein the slot opening is configured to receive a corresponding tab of the connector to couple the tab of the connector to the slot opening via a snap-fit.

9. A fitting for use in establishing a fluid connection with a pipe, the fitting comprising:
   a body;
   a clamp coupled to the body, the clamp configured to couple the fitting to the pipe, the clamp including first and second arms extending generally away from the body, the first and second arms being free of engageable jaw portions;
   a tap coupled to the body and extending generally away from the body, the tap including a spike-shaped tip defining multiple windows in the tap for establishing the fluid connection with the pipe, the tap configured to press-fit into the pipe for establishing the fluid connection between the fitting and the pipe, at least one of the multiple windows including an upper edge portion that defines a sloping orientation for decreasing friction between the tap and the pipe when inserting the tap into the pipe; and
   a passageway defined by the body and the tap, for receiving fluid from the pipe and into the fitting via the tap.

10. A fitting for use in making a fluid connection with an irrigation pipe in an irrigation system, the fitting comprising:
   a saddle for coupling the fitting to the irrigation pipe; and
   a tap coupled to the saddle and configured to press-fit into the pipe, without threading the tap relative to the saddle, for establishing the fluid connection between the fitting and the pipe, the tap defining multiple windows for establishing the fluid connection with the pipe, at least one of the multiple windows including an upper edge portion that is slanted in orientation, for decreasing friction between the tap and the pipe at the cross support when inserting the tap into the pipe.

11. The fitting of claim 10, wherein the saddle and the tap are integrally formed as one piece.

12. The fitting of claim 11, wherein the tap includes a spike-shaped tip having a cross support defining the multiple windows in the tap for establishing the fluid connection with the pipe.

13. The fitting of claim 12, wherein the multiple windows include four windows; and wherein the cross support includes four members defining the four windows.

14. A fitting for use in establishing a fluid connection with a pipe, the fitting comprising:
   a body;
   a clamp coupled to the body, the clamp configured to couple the fitting to the pipe, the clamp including first and second arms extending generally away from the body, the first and second arms being free of engageable jaw portions;
   a tap coupled to the body and extending generally away from the body, the tap including a spike-shaped tip configured to press-fit into the pipe for establishing the fluid connection between the fitting and the pipe; and
   a passageway defined by the body and the tap, for receiving fluid from the pipe and into the fitting via the tap.

15. The fitting of claim 14, wherein the tap is configured to press-fit into the pipe at about the same time the clamp is configured to couple the fitting to the pipe.

16. The fitting of claim 15, wherein the body, the clamp, and the tap are integrally formed as one piece.

17. The fitting of claim 16, wherein the tap includes a cross support defining multiple windows in the tap for establishing the fluid connection with the pipe.

18. The fitting of claim 17, wherein the multiple windows include four windows; and
   wherein the cross support includes four members defining the four windows.

19. The fitting of claim 18, wherein at least one of the multiple windows comprises an upper edge portion that defines a sloping orientation, for decreasing friction between the tap and the pipe at the cross support when inserting the tap into the pipe.

20. The fitting of claim 18, wherein the tap defines a barb generally above the four windows, the barb configured to engage an inner surface of the pipe to inhibit removal of the fitting from the pipe.

\* \* \* \* \*